United States Patent [19]
Ward

[11] Patent Number: 5,288,187
[45] Date of Patent: Feb. 22, 1994

[54] TIE DOWN ASSEMBLY FOR CONTAINER LOADS

[76] Inventor: Montague R. Ward, 5500 Oleta St., Long Beach, Calif. 90815

[21] Appl. No.: 901,268

[22] Filed: Jun. 19, 1992

[51] Int. Cl.⁵ .............................................. B25B 28/00
[52] U.S. Cl. .................. 410/100; 24/68 CD
[58] Field of Search .................. 410/100, 96, 97; 24/68 R, 68 CD, 68 CT, 68 D; 254/228

[56] References Cited

U.S. PATENT DOCUMENTS

| | | | |
|---|---|---|---|
| 2,638,318 | 5/1953 | Nampa | 254/106 |
| 2,935,300 | 5/1960 | Elsner | 254/51 |
| 3,601,864 | 8/1971 | Roberts et al. | 24/68 |
| 4,157,171 | 6/1971 | Hasselas | 254/67 |
| 4,223,869 | 9/1980 | Patterson et al. | 24/68 |
| 4,993,687 | 2/1991 | Crook et al. | 254/228 |

FOREIGN PATENT DOCUMENTS 2188116  9/1987  United Kingdom ................ 410/100

OTHER PUBLICATIONS

Marine Technology vol. 14, No. 2, Apr. 1977, pp. 175-191, "Design of On-Deck Container Security Systems", by King-Tao Liu et al.

Primary Examiner—Mark T. Le
Attorney, Agent, or Firm—Price, Gess & Ubell

[57] ABSTRACT

A tensioning assembly is provided for providing and maintaining a desired tension on a cable lashing for use in securing a container on board a container ship. The assembly includes a pair of mutually-engaging linking members, a separate and removable set of hydraulic jacks for pulling the linking members together to thereby provide a tension to a cable lashing connected to the linking members, and a set of one or more locking wedges for locking the linking members in a position of relative displacement, to thereby maintain the tension on the cable. Once locked, the hydraulic jacks may be detached and used for tensioning additional cable lashings. The lashing assembly thus provides an inexpensive and reliable mechanism for quickly setting the desired tension of a cable lashing and for maintaining that tension. No special tools or special skills are required to operate the assembly.

27 Claims, 3 Drawing Sheets

TIE DOWN ASSEMBLY FOR CONTAINER LOADS

BACKGROUND OF THE INVENTION

1. Field of the Invention

The present invention generally relates to lashing assemblies for securing stacks of containers to the decks of ships and, in particular, to tensioning mechanisms for providing a selected tension to a container lashing.

2. Description of Related Art

The shipping of containerized cargo has become commonplace in the maritime shipping industry. Typically, a large number of cargo containers is secured to the deck of a shipping vessel. Often, the containers are stacked in tiers of two or three or more on the deck of the ship.

The containers are secured to the deck of the ship by lashing cables or bars which hook into fittings rigidly mounted to the decks. Usually two or more lashing cables are used at each end of each stack to secure each stack of containers, with each container lashing mounting to the deck on opposing sides of the container and being locked to a corner fitting on the container. Tension is applied to the lashing cables to prevent movement of the container.

It is particularly important that proper tension be applied to the cable lashings. If tension is too great, the cables may damage the container, either by cutting into the container or by causing a portion of the container to buckle. If too little tension is provided, then the container may slide on the deck under heavy seas. Further, the container may rock or torsionally deform in some manner. In general, the container is subject to a wide range of forces including the pitch and heave of the ship, the yaw, sway, and surge of the ship, and the roll of the ship. Also, moving water and high winds at sea can impose large forces on the containers.

Given the various forces acting on the container at sea, it is desirable to be able to apply a particular tension for the lashing cables. Further, given that lashings may be untensioned by these forces, it is desirable to provide a means for quickly varying the tension of each of the on-board lashings while at sea.

However, conventional mechanisms for setting the tension of a cable lashing do not allow a preselected tension to be quickly and accurately achieved. For example, a conventional turnbuckle does not provide an adequate indication of the tension of the cables. Further, a conventional turnbuckle requires considerable time and strength to tighten. Commonly, two or more men are needed to set significant tension in each lashing using a conventional turnbuckle. Further, conventional turnbuckles include components, such as engaging screws and nuts, which deteriorate in the harsh environment of the deck of a shipping vessel so that they are extremely difficult to tighten effectively. These components often rust or corrode when exposed to the wet and briny environment of the deck of the ship. Once rusted or corroded, the turnbuckles cannot effectively be used.

In normal practice, lashing devices are lightly tightened in a cursory manner in an effort to keep them engaged so that they do not become undone in the progress of the voyage. The lashing devices are not tensioned to any great or consistent degree. There is an advantage to a lashing assembly that can be tightened consistently to a known tension that will endure for the duration of the voyage.

For these various reasons, it is difficult to quickly and effectively provide a desired tension to each of the many cable lashings used to secure numerous containers to a container ship. Hence, usually no attempt is made to set the cable lashings to an optimal, uniform, or substantial tension. Without optimal or uniform tension, the containers are subject to damage or destruction at sea. In some cases, the cable lashings themselves snap under the load, thus freeing the container, resulting in damage or destruction to the ship or to other containers on board the ship. Worse, the safety of the crew members is placed in jeopardy in the event one of the cable lashings snaps.

SUMMARY OF THE INVENTION

Accordingly, it can be appreciated from the foregoing that there exists a need to provide an improved assembly for tensioning or lashing a cable to the deck of a container ship, and for quickly and easily obtaining a predetermined tension within the lashing cable.

These and other objects are achieved by an assembly for tensioning a lashing, having a means for providing a selected tension to the lashing, with the tensioning means being detachable from the lashing, and having means for maintaining the tension on the lashing after the tensioning means is detached.

Thus, there are two major components of the assembly, a lashing (locking) device and a separate tensioning device which is only used to set or adjust the tension of the lashing device and is removed from the lashing device at other times.

Since the tensioning means is separate from the locking means, a single tensioning means may be used for tensioning numerous shipboard lashings. The single tensioning means is applied in succession to linking members attached to each shipboard lashing to tension the lashings to a predetermined uniform tension. Once tensioned, the locking means is engaged to lock the mutually-engaging linking members of each lashing together to maintain the preselected tension. Once locked, the tensioning means may be detached and used to tension additional lashings.

In accordance with a preferred embodiment, the assembly includes a lashing device having a pair of mutually-engaging linking members provided along a lashing. A detachable tensioning means is provided for pulling the linking members of the linking device together to tension the lashing. A locking means is provided for maintaining tension on the lashing. The lashing device includes guide means for securing the linking members together and for limiting relative movement of the linking members to along a single axis.

The pair of mutually-engaging linking members includes a first linking member having a slotted extension member extending outwardly from a base plate, and a second linking member having a pair of extension members extending outwardly from a base plate. A connecting bar connects free ends of the pair of parallel extension members of the second linking member. The extension member of the first linking member is held between the parallel pair of extension members of the second linking member with the slots of the first and second linking members adjacent and parallel. In this manner, the linking members are attached to each other and may slide along an axis parallel to the slots. Torsional movement is eliminated. Within the slots, wedges are inserted to lock the linking members together to prevent outward displacement.

The detachable tensioning means preferably comprises a pair of hydraulic push/pull jacks. Each jack includes a pair of bails extending from opposing ends. The opposing bails of each jack are hooked over ears or tabs extending from the bases of the opposing linking members. One hydraulic jack is provided on each side of the pair of linking members. As the hydraulic jacks are contracted, the opposing linking members are pulled together, thus tensioning the shipboard lashing. Once the hydraulic jacks have pulled the linking members together by a desired amount, wedges are inserted through the slots formed in the linking members to retain the tension. After the wedges are inserted, the hydraulic jacks are relaxed and removed from the linking members. Thus, the tension of the lashing, which is originally achieved by operation of the hydraulic jacks, is maintained by one or more simple wedges.

To release the tension of the lashing, the hydraulic jacks are again mounted to the opposing linking members, and the linking members are drawn together a sufficient amount to release the wedges. The wedges are removed. Then, the hydraulic jacks are released and removed from the linking members to release the tension on the lashing. Alternatively, the wedges may be hammered out to release the tension just prior to unloading the containers.

Preferably, the wedges used for locking the linking members together have angled edges. The angled edges allow the linking members to be locked at any desired relative displacement and tension. The extent to which the angled wedges are inserted through the slots varies the effective width of the wedge within the slot to maintain the displacement of the linking members.

The locking assembly is relatively immune from malfunction due to deformation, rust, and corrosion which renders conventional turnbuckles inoperative. With a conventional turnbuckle, a threaded nut and bolt tensioning mechanism is employed which remains exposed to the harsh shipboard marine environment and can easily be bent. However, with the invention, separate powered means, such as hydraulic jacks are used to tension the lashing. These devices may be stored below deck when not used for tensioning, where they are protected from the harsh marine environment. Only the lashing device and the locking wedges are exposed to the weather during the sea voyage. These components are designed to be sufficiently durable to withstand continuous on-board use for a long life, including being moderately bent and corroded without breaking or becoming inoperable.

Further, by employing separate powered means to apply the tension to the lashing, little or no human strength is required to tension the lashings. A single unskilled stevedore or deck hand using a single pair of tensioning devices can quickly tension an entire set of lashings, thus securing all the lashed containers. Not only can the lashings be quickly tensioned, but the amount of tension may be uniformly applied to each separate lashing. Furthermore, only one complete tensioning assembly is needed for many lashing devices, thus reducing cost and complication.

Other than bails mounted to the ends of a hydraulic jack tensioning assembly for engaging the linking members, the jacks themselves may be entirely conventional and can be used for other purposes when not in use for tensioning the lashings. In this regard, the bails are designed for easy mounting to and removal from the hydraulic jacks. Although described as a tensioning device using a pair of hydraulic jacks, any of a wide number of manual or power-driven tightening devices can be used to mount to the linking members to pull the linking members together and thereby tension the lashing. Further, the invention is applicable to securing containers on other modes of transportation, such as barges, railroad cars, airplanes, and trucks.

In an alternative embodiment, the linking members are configured to allow tension to be applied to the lashings by a pair of jacks adapted to press outwardly rather than pull inwardly. In other words, the jacks operate in a compression mode rather than in a retraction mode. In this embodiment, linking members are provided which each include a pair of extension members having elongated slots. The extension members of a first linking member are separated by a certain distance, and the extension members of the second linking member are separated by a lesser distance. Free ends of the extension members of each respective linking member are connected by a perpendicularly-extending plate or connecting bar. The extension members of the second linking member are disposed between the extension members of the first linking member. The connecting bar of the second linking member is held within the elongated slots of the first linking member. The connecting bar of the first linking member is held within the elongated slots of the second linking member. In this manner, the linking members are slidably engaged similarly to the preferred embodiment described above.

However, in the alternative configuration, jacks are provided which engage the connecting bars and press outwardly on the connecting bars. By pressing outwardly on the connecting bars, the linking members are drawn together to thereby tension the lashing. Thus, the jacks operate in a compression or push mode. However, the alternative embodiment shares the advantages of the previously-described embodiment, namely, the tensioning means is detachable and the linking members may be locked in relative displacement by a simple pair of wedges or the like to maintain the tension on the lashing once the tensioning means is removed.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a lashing assembly having a detachable tensioning device.

Referring to the figures, a preferred embodiment of the invention will now be described. The figures show a lashing assembly 10 which includes a lashing device having a pair of upper and lower linking members 12 and 14, a set of one or more steel wedges 16 for insertion through the linking members, and a pair of hydraulic jacks 18 provided for pulling the linking members together.

Lower linking member 14 is securely mounted to a deck fitting 20 (FIGS. 3-5) anchored into the deck 22 of a container vessel. Deck fitting 20 is conventional and includes a horizontal mounting bolt 24. Lower linking member 14 includes a base plate 26 provided with a bore or aperture 28 for pivotally mounting over the horizontal mounting bolt 24 of the deck fitting. In this manner, the linking assembly is allowed to pivot with respect to the deck through a wide range of angles.

Upper linking member 12 is securely mounted to a conventional lashing bar or cable 30 (FIGS. 3, 4, and 5) which, in use, is securely attached to a container (not shown) to be secured. Lashing bar 30 is conventional and includes a mounting bolt 32. Upper linking member 12 includes a base plate 34 provided with a bore or aperture 35 for mounting over mounting bolt 32. In this manner, upper linking member 12 is securely and pivotally attached to the lashing bar.

Although described with respect to specific conventional deck fitting and lashing bar structures, the linking assembly of the invention can be easily configured to mount to a wide variety of alternative deck fitting and lashing bar or cable structures. Hence, the invention is not limited for use with the specific deck fittings and lashing bars shown herein.

Upper linking member 12 includes an extension member 36 extending outwardly from base plate 34. An elongated slot 38 extends substantially along the length of extension member 36 from base plate 34 to a free end of extension member 36. Preferably, extension member 36 is integrally formed with base plate 34 from a single durable iron or steel plate. However, a wide variety of component materials can be used for forming the linking members. Any moderately durable metal having sufficient tensile strength to withstand typical lashing stresses may be used.

Lower linking member 14 includes a pair of extension members 40 and 42. Extension members 40 and 42 each include an elongated slot extending along their respective lengths from base plate 26 to respective free ends of the extension members. The elongated slots of extension members 40 and 42 are denoted by the reference numeral 44. Extension members 40 and 42 are substantially identical, and are mounted with their elongated slots adjacent and parallel to each other. Slots 44 of the extension members of lower linking member 14 are of the same width and approximately the same length as slot 38 of upper linking member 12.

Unlike the configuration of the upper linking member, wherein extension member 36 lies within a plane of base plate 34, the extension members 40, 42 of lower linking member 14 are offset from the plane of the base plate 26. More specifically, extension members 40, 42 of lower linking member 14 are mounted to side surfaces of base plate 26 such that a gap exists between extension members 42 and 44. This gap has a width slightly greater than the thickness of extension member 36 of upper linking member 12. Extension members 40 and 42 may be welded to the side surfaces of base plate 26, or may be formed as a single die cast unit.

Extension members 42 and 44 are connected at their free ends by a connecting member or abutment bar 46. Abutment bar 46 is a flat metal bar or plate of approximately the same width as slot 38 of extension member 36 of upper linking member 12. Extension member 36 of upper linking member 12 also includes an abutment bar 48 mounted to its free end. Both abutment bars 46 and 48 extend perpendicular to their respective extension members. Hence, the abutment bars extend perpendicular to base plates 12 and 14 and perpendicular to the slots 38 and 44 formed in the extension members.

The various slotted extension members and abutment bars of the linking device provide a guide means to allow upper linking member 12 to engage slidably with lower linking member 14 and to ensure that the linking members only slide along an axis defined by the parallel slots. More specifically, extension member 36 of upper linking member 12 is held between parallel extension members 40, 42 of lower linking member 14. Abutment bar 46 of lower linking member 14 is held within slot 38 of upper linking member 12. Likewise, abutment bar 48 of upper linking member 12 is held between parallel slots 44 of lower linking member 14. In this manner, upper linking member 12 is permanently linked to lower linking member 14. With the provision of abutment bars held within the slots, the linking members are free to slide with respect to each other.

The widths of the various plates, bars, and slots are selected to allow the upper linking member to be closely received and guided between the extension members of the lower linking member, and to allow the abutment bars to be closely received in and guided by the slots of the opposing extension members. In this manner, the upper and lower linking members are securely connected and cannot be completely separated, but are allowed to slide with respect to each other along the axis defined by the elongated slots. Torsional movement of the linking members is prevented. Only inward and outward relative movement of the linking members is permitted. The various slots are slightly wider than the bars received within the slots to ensure smooth and unhindered relative movement of the upper and lower linking members. Clearances between moving parts are sufficiently generous so that corrosion and moderate permanent deformation will not affect the ability of the device to function properly.

Figures 1, 2:
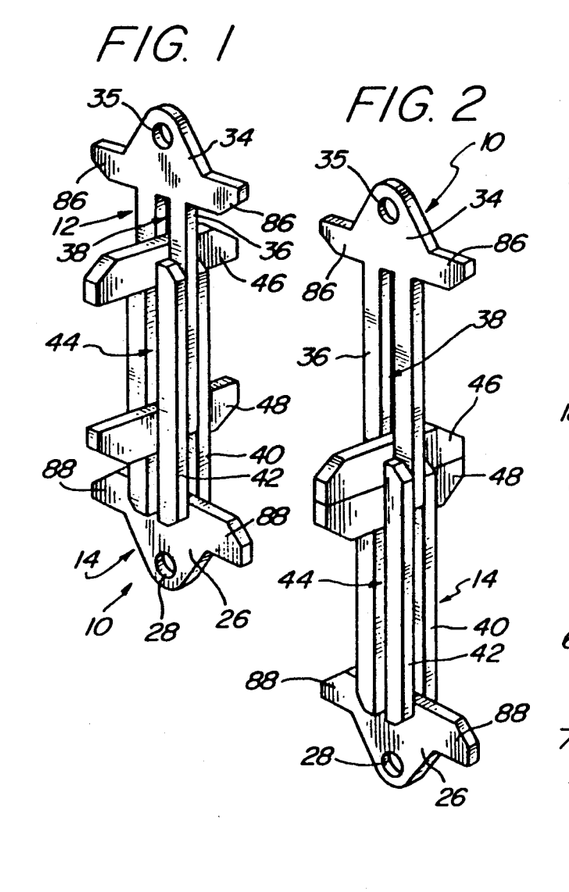
FIG. 1 is a perspective view of a lashing device constructed in accordance with a preferred embodiment of the invention shown pulled partially together in a service configuration.
FIG. 2 is a perspective view of the lashing device of FIG. 1 shown pulled fully apart in a slack configuration.

Thus, the linking members may be moved relative to each other between a fully extended position (FIG. 2), wherein the abutment bars of the upper and lower linking members lie adjacent, and the base plates of the respective linking members are positioned wide apart, and a second, partially tightened position (FIG. 1), wherein the abutment bar of the lower linking member lies adjacent to the base plate of the upper linking member and the abutment bar of the upper linking member lies adjacent to the base plate of the lower linking member. In a fully tightened position (not shown), the base plates of the linking members are pulled as close together as permitted. The range of relative displacement between the upper and lower linking members is determined by the length of the slotted extension members. Preferably, these extension members are approximately one foot long for allowing the linking members to be displaced through a range of one foot.

Since lower linking member 14 is securely attached to the deck through deck fitting 20, and upper linking member 12 is securely mounted to lashing bar or cable 30, any relative displacement of the linking members tensions or slackens lashing bar or cable 30. In the fully extended position of FIG. 2, an attached lashing would be at a minimum or slack tension. In this configuration, the lashing would be sufficiently slack to allow it to be mounted onto or removed from a container to be secured. In the tightened or service position of FIG. 1, the linking members are drawn together to place an attached lashing under a tension, to thereby secure the container. The amount of tension is determined by the relative displacement of the linking members and the elasticity of the lashing. That is, with the base plates disposed far apart, little or no tension exists within an attached lashing cable and, with the base plates drawn together, a greater amount of tension is applied to an attached lashing cable. Thus, an inverse relationship exists between the distance between the base plates of the linking members and the tension applied to a lashing. The greater the distance, the lower the tension.

Once linking members 12 and 14 are engaged by positioning abutment bars 46 and 48 within slots 38 and 44 of the opposing linking member, the linking members cannot be completely separated. Thus, to initially manufacture the linking assembly, upper and lower linking members 12 and 14 must be mutually linked before both of the abutment bars are mounted to the extension members. Welding of the abutment bars to the extension members is the final manufacturing step. Once all components are linked and welded together, the upper and lower linking members cannot be completely separated.

Figure 3:
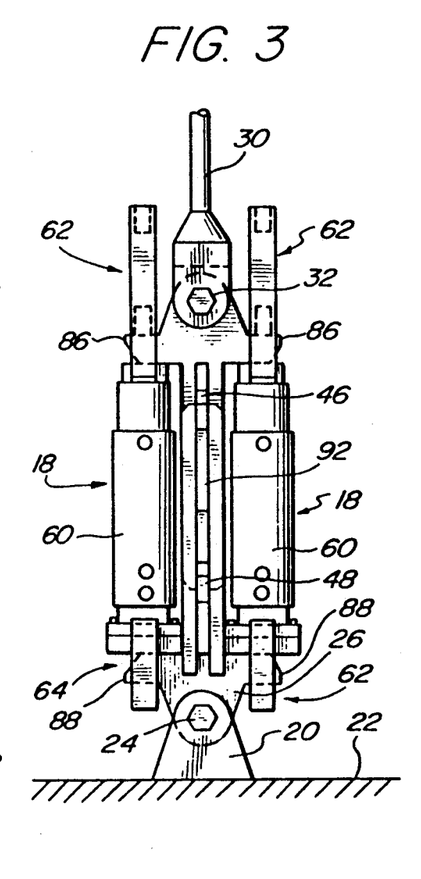
FIG. 3 is a front view of a lashing assembly including the lashing device of FIG. 1 (shown in a service position), a pair of tensioning devices mounted thereto, and a pair of locking wedges inserted therein.
Figures 4, 6:
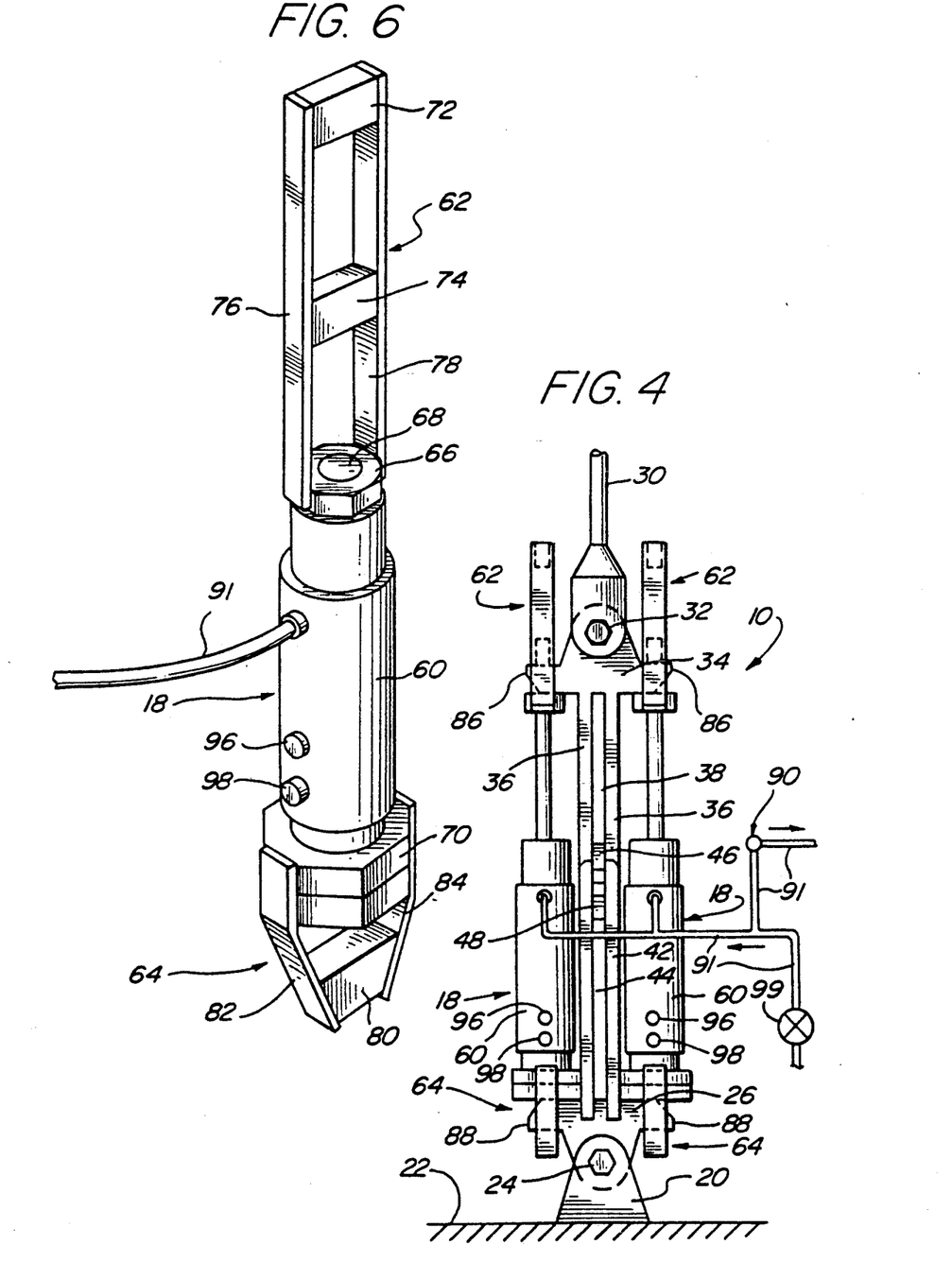
FIG. 4 is a front view of the lashing device of FIG. 1 shown in a slack configuration, with a pair of tensioning devices, shown with hydraulic hoses mounted thereto.
FIG. 6 is a perspective view of a jack of the tensioning device of FIGS. 3 and 4.

As shown in FIGS. 3, 4, and 6, the lashing assembly also includes a tensioning device comprising a pair of hydraulic jacks. Each jack 18, shown most clearly in FIG. 6, includes a push/pull hydraulic jack mechanism 60 provided with upper and lower mounting bails 62 and 64. Jack mechanism 60 may comprise any suitable push/pull mechanism such as, for example, an Enerpac RD 256 push/pull double acting hydraulic cylinder having a 6¼-inch stroke and producing a 49,000-pound push pressure and a 21,000-pound pull pressure. Upper bail 62 includes a mounting nut 66 provided for mounting to a threaded shaft 68 provided on the conventional hydraulic jack 60. Likewise, lower mounting bail 64 includes a mounting nut or lug 70 provided for mounting over a second threaded mounting bolt (not shown) extending from an opposing end of hydraulic jack 60.

Upper mounting bail 62 includes a pair of parallel cross bars 72 and 74 mounted between a pair of parallel extending bars 76 and 78. Lower mounting bail 64 includes a single cross bar 80 connecting a pair of angled extending bars 82 and 84. The upper and lower mounting bails allow a tensioning device with a stroke smaller than the allowable stroke of the lashing device to be used over the full stroke of the lashing device simply by repositioning the bails on the ears 86 and 88.

Referring to FIGS. 3 and 4, mounting plate 34 of upper linking member 32 includes a pair of diametrically opposing ears or tabs 88. Likewise, base plate 26 of lower linking member 14 includes a pair of diametrically opposing ears or tabs 86.

Ears 86 and 88 extend perpendicular to the direction of extending members 36, 42, and 44. In use, a first hydraulic jack 18 is mounted to one side of the linking members. To mount the jack to the linking members, lower bail 64 is mounted to lower ear 88 by inserting ear 88 between crossbar 80 and jack mechanism 60. Likewise, either upper bail 72 or lower bail 74 is mounted to upper ear 86 by inserting ear 86 between one of crossbars 72 or 74 and jack mechanism 60.

A second hydraulic jack is mounted in the same manner to the opposing side of the linking members to achieve the configuration shown in FIGS. 3 and 4. To facilitate mounting of the jacks to the linking members, the hydraulic jack 60 may be expanded or contracted by a desired amount to extend or retract the mounting bails to achieve a relative distance between the mounting bails equal to a relative distance between the ears 86 and 88. Expansion or contraction of the hydraulic jacks is achieved by using conventional controls provided on the jacks. The jacks are always operated simultaneously by the controls.

As shown in FIG. 4, the jacks are supplied simultaneously from a single source of hydraulic pressure. The maximum pressure in the assembly and, hence, the maximum desired tension capable of being developed in the lashing device, is set prior to actually tensioning any lashings according to the results of a previous calibration. The jacks are connected in parallel by hydraulic pressure hose 91 to the single source (not shown) of hydraulic pressure and, therefore, the tensioning force developed by each of the identical jacks is also substantially identical, and the lashing device can be tensioned evenly by the two jacks connected in this manner. The preferable mode of operation is to tension all lashings as equally as possible without resetting the tension for each separate lashing. The desired pressure is set by adjusting a pressure relief valve 90 along hydraulic pressure hose 91. A pressure gauge 98 operates to indicate the pressure provided by the hydraulic jack when in operation. Relief valve 90 provided along hose 91 is used to select a pressure threshold above which pressure is released from the hydraulic jack to prevent further expansion or retraction. Thus, pressure relief valve 90 allows a specific hydraulic pressure to be selected to ultimately achieve a predetermined tension on the cable lashing.

Once mounted to the linking members in the slack position of FIG. 4, the jacks are simultaneously activated by operating a control valve 99, also provided along hydraulic hose 91, to supply hydraulic pressure to each jack. The direction of hydraulic flow is shown by arrows in FIG. 4. Upon activation, hydraulic jacks 18 simultaneously retract, to thereby pull upper linking member 12 closer to lower linking member 14, thus increasing tension on the cable lashing. As the hydraulic jacks retract, abutment bar 48 of the upper linking member is drawn downwardly through slot 44. Likewise, abutment bar 46 of the lower linking member is drawn upwardly through slot 38. Retraction continues until the desired hydraulic pressure is achieved, which triggers relief valve 90 to release additional pressure as soon as the desired lashing tension is achieved, thus ensuring that the hydraulic jack does not contract further.

The resulting tightened or service configuration of the linking assembly is shown in FIG. 3. As can be seen from FIG. 3, an opening or slot 92 is formed between the abutment bars 46 and 48. Within this opening, one or more wedges 16 are inserted. Each wedge 16 includes at least one angled edge 17 which allows the wedge to be snugly inserted to hold the tension on the lashing device regardless of the displacement between the abutment members. If a single wedge is insufficient, two or more wedges may simultaneously be inserted into opening 92 to fit snugly between abutment members 46 and 48. One of the abutment members may have an angled abutment edge equal in angle to the wedge. This ensures that a single wedge fits snugly between the abutment members. The wedges can be kept from sliding out by friction under tension or by retaining pins 21 mounted in bores in the wedges.

Figure 5:
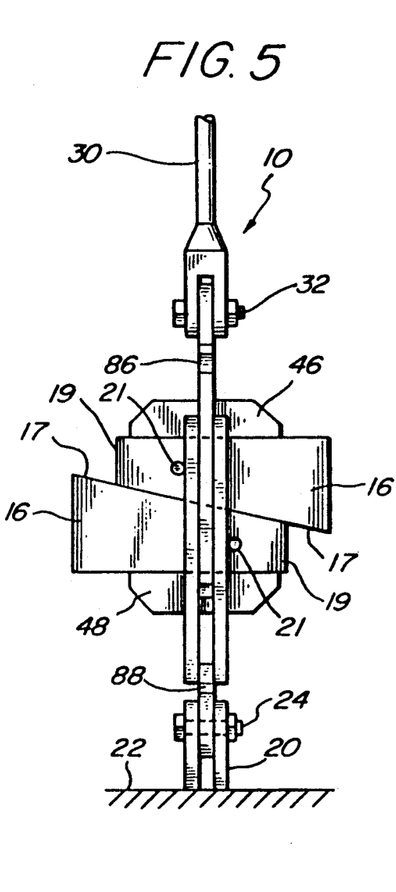
FIG. 5 is a side view of the lashing assembly of FIG. 3, with the pair of tensioning devices removed.

Taking the example in FIG. 5, wherein a pair of wedges are inserted, a narrow end 19 of each wedge is initially inserted through the gap until the sides of the wedge abut against the abutment members 46 and 48. If the abutment members are fairly close together, the wedges will only be partially inserted through the gap. However, if the abutment members have a somewhat larger gap, then at least one of the wedges is inserted a greater distance so that the gap is completely filled by the wedges.

Once the wedges are snugly inserted, hydraulic jacks 18 are removed by releasing hydraulic pressure within the jacks. Release of pressure may be achieved by operating control valve 99. By completely releasing the pressure of the hydraulic jacks, the upper and lower bails of the jacks will move and become free of the ears of the linking members such that the jacks may be completely removed from the linking members. Although the hydraulic jacks are removed, the tension of the lashings is maintained by locking wedges 16. That is, tension of the lashing pulls the upper linking member upward, thus pressuring abutment bar 48 up against a lower edge of locking wedges 16. Since the lower linking member 14 is securely mounted to the deck, upper abutment member 46 remains stationary. Accordingly, wedges 16 prevent the linking members from being pulled apart by the tension, thus maintaining the tension of the lashing at a constant level.

Thus, to achieve a desired tension in the cable lashing, the pressure release of a pair of hydraulic jacks is set to a desired hydraulic pressure corresponding to the desired tension. Then the hydraulic jacks are mounted to the upper and lower links disposed in the slack configuration. Next, the hydraulic jacks are activated, thus drawing the linking members together and applying tension to the cable lashing. Once the hydraulic jacks have retracted by a desired amount to achieve a desired tension, one or more wedges are inserted within an opening formed between the abutment members of the upper and lower links. Then the hydraulic jacks are removed and the locking wedges remain in position to prevent the linking members from being pulled apart by the tension, to thereby maintain the desired tension on the cables.

After the hydraulic jacks are used to set the tension of the first cable lashing, the jacks may be used on a second linking assembly provided on a second cable lashing to set the desired tension of the second lashing. A single pair of hydraulic jacks may be used to tension numerous cable lashings, all to a uniform tension. Alternatively, the hydraulic jacks may be reset for each separate lashing to achieve a different tension for each different lashing.

Furthermore, once all lashings have been tensioned to a desired amount, the upper and lower bails of the hydraulic jack 18 can be removed to allow the jacks to be used for other purposes.

Although described with respect to a specific form of push/pull hydraulic jack, any suitable tensioning mechanism can be used for pulling the upper and lower linking members together to tension the lashing. Thus, for example, a manually-operated tensioning mechanism could be used. Alternatively, any of a variety of powered tensioning mechanisms could be used. In general, any device capable of mounting to the opposing linking members to pull the linking members together may be satisfactory. The hydraulic jacks described above are particularly useful since they are relatively lightweight, controllable, powerful, and inexpensive and can be used for other purposes by removing the upper and lower mounting bails.

By using the hydraulic jacks of the invention, a single worker can easily, yet strongly, provide a uniform tension to a large number of lashings in a relatively short period of time.

To release the tension on the lashing, hydraulic jacks 18 are again mounted to ears 86 and 88 of the upper and lower linking members. The pressure relief valve 90 is set to increase the pressure of the hydraulic jack slightly to thereby cause the jack to retract a greater amount. Once activated, the upper and lower linking members are slightly pulled together to release pressure on locking wedges 16 to allow the wedges to be easily removed from opening 92. Once removed, control valve 99 is operated to release pressure and allow the hydraulic jacks to gradually extend, thereby allowing the upper and lower linking members to separate, thus releasing tension on the cable lashing. When the cable lashing is slack, hydraulic jacks 18 are removed and may be reused to release tension on other cable lashings. Alternatively, the lashings may be released by knocking the wedges out with a hammer without using the tensioning device.

Figure 7:
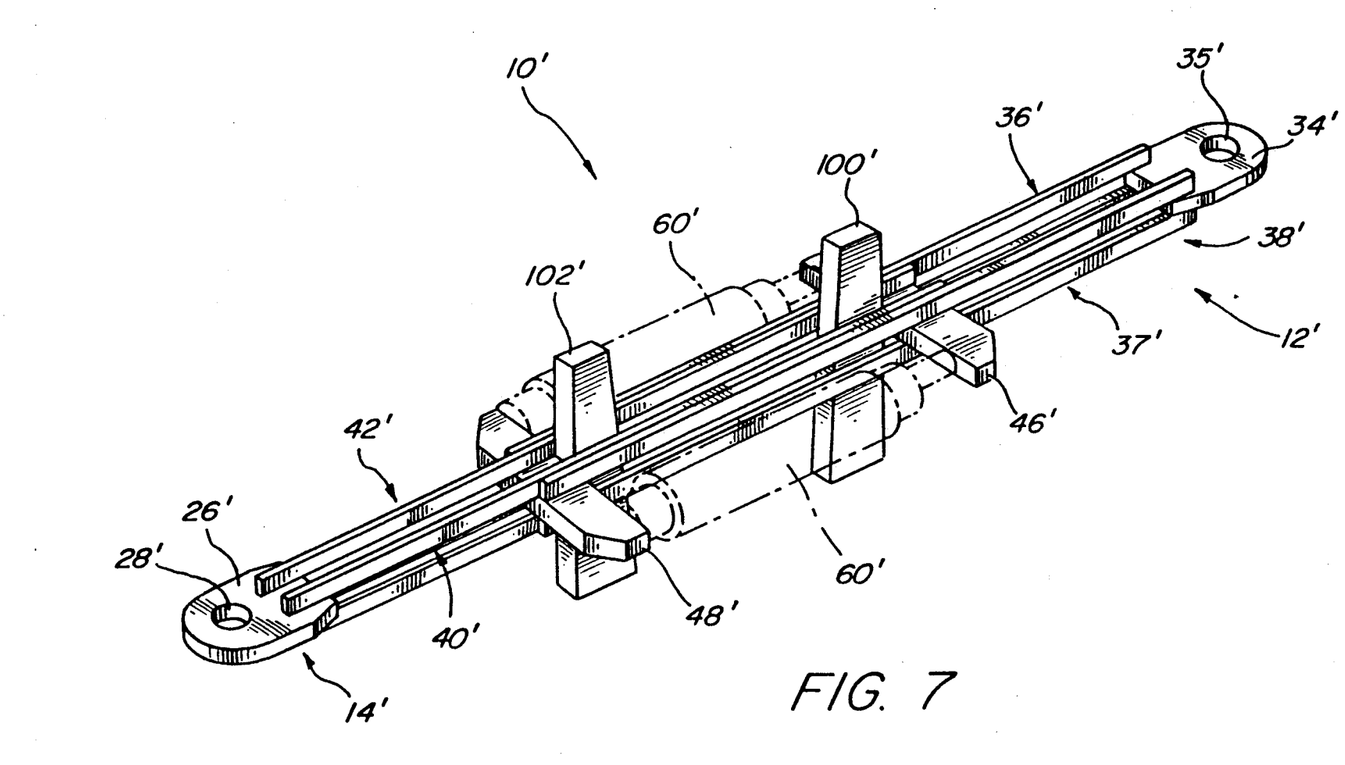
FIG. 7 is a perspective view of an alternative embodiment of the lashing device of FIG. 1.

Referring to FIG. 7, an alternative embodiment of the invention will now be described. The embodiment of FIG. 7 is similar to the embodiment shown in the preceding figures, and like elements will be identified by like reference numerals with primes attached.

FIG. 7 illustrates a lashing device or coupling 10' having an upper linking member 12' and a lower linking member 14'. Upper linking member 12' includes a pair of elongated extension members 36' and 38'. Each extension member comprises two thin elongated plates mounted coplanarly and separated by a narrow longitudinal elongated slot or aperture 37'. Extension members 36' and 38' are oriented parallel with each other, but are separated by a distance. Base ends of the extension members are welded to opposing ends of a base plate 34' having a bore 35' which facilitates mounting the lashing device to a lashing bar (not shown in FIG. 7).

Lower linking member 14' likewise includes a pair of planar parallel extension members 40' and 42'. Each extension member 40' and 42' comprises a pair of thin elongated plates mounted coplanarly and separated by a narrow longitudinal elongated slot. Base ends of the extension members are welded to a base 26' having a bore 28' which facilitates mounting of the lower linking member to a lashing bar or directly to a deck fitting (not shown). Whereas extension members 36' and 38' are mounted to opposing ends of base plate 34' such that the members are fairly far apart, extension members 40' and 42' of lower linking member 14' are mounted closer together.

Free ends of the extension members of the upper linking member are mounted to a connecting bar or plate 48'. Connecting bar 48' is oriented perpendicular to the planes defined by the extension members. Edges of free ends of the extension members are welded to side surfaces of connecting plate 48'. Lower linking member 14' also includes a connecting bar or plate 46' to which edges of free ends of the extension members of the lower linking member are welded.

As noted above, the extension members of the lower linking member are separated by a distance less than the distance separating extension members of the upper linking member. This difference in distance is sufficient to allow the extension members of the lower linking member to be held between the extension members of the upper linking member, as shown. To hold and guide the various extension members together in a parallel sliding configuration, the connecting bar of the lower linking member is held within the slots of the upper linking member. Likewise, the connecting bar of the upper linking member is held within the slots of the lower linking member. With this arrangement, the extension members remain engaged and parallel with each other, yet are allowed to freely slide along a longitudinal axis of the coupling.

As with the embodiment described above, once the various extension members and connecting bars are welded together, the upper and lower linking members can no longer be separated. Rather, the linking members can only slide with respect to each other between a slack position wherein the connecting bars are close together and the bases are widely separated, and a service position wherein the connecting bars are pushed apart and the bases are drawn more closely together.

Whereas the connecting bars of the first embodiment described above directly act to abut against mounting wedges, the coupling of FIG. 7 is provided with a separate set of abutment plates. These plates are respectively identified by 100' and 102'. Plate 100' is welded between the pair of extension members of the lower linking member. Preferably, the distance separating the extension members of the lower linking member is exactly equal to a width of abutment plate 100'. Abutment plate 102' of the upper linking member is mounted perpendicular to the connecting bar 48' between the extension members of the upper linking member. A side edge of abutment plate 102' is welded against a side edge of connecting bar or plate 48' in a perpendicular configuration, as shown in FIG. 7. Abutment plate 102' has a width which is preferably slightly less than the distance separating extension members of the lower linking member. In this manner, abutment plate 102' can easily slide longitudinally between the extension members of the lower linking member. With this configuration, the abutment plates are carried along with the connecting bars, and a distance separating the abutment plates varies according to the extent to which the linking members are pulled together or drawn apart.

A set of one or more wedges, not shown in FIG. 7, may be inserted between the pair of abutment members through a planar aperture or slot formed between the parallel extension members of the lower linking member. In this configuration, the wedges are held securely and prevent the linking members from being pulled apart by tension on the lashing. The wedges are closely received between the extension members of the lower linking member and cannot twist or buckle in a manner which would allow the wedges to become disengaged from between the abutment plates.

A pair of jacks 60' are shown in phantom lines in FIG. 7. Opposing ends of each jack engage with, or are positioned against, inner edges of connecting bars 46' and 48'. In use, the jacks press outwardly to push the connecting bars outwardly and pull the bases of the linking members together to thereby tension the lashing. Once a desired tension is achieved, one or more wedges are inserted between the abutment plates to maintain the tension. Then, the jacks are removed and used to tension other lashings. To remove the tension from the lashing, the jacks are repositioned between the connecting bars and activated to push the connecting bars a slight distance outwardly to allow the wedges to be easily removed. Once the wedges are removed, the pressure on the jacks is decreased to allow the connecting bars to be drawn closer together, thus slackening tension on the lashing. Alternatively, tension may be removed merely by hammering the wedges to knock the wedges out from between the abutment plates.

As with the embodiment of FIGS. 1-6, alternative tensioning means may be employed with the embodiment of FIG. 7. Any tensioning device which can engage the connecting bars and push them apart can be used to tension the lashing.

In either embodiment, the relative sizes and dimensions of the various components may be selected for particular applications. Typically, the linking members are sized for relative displacement of approximately one foot to allow a typical cable lashing to be contracted from a slack configuration to a highly tensioned state.

Preferably, hydraulic jack 18 or other tensioning device has a capacity of at least 25 to 50 kips tension. Likewise, the upper and lower linking members should be sufficiently sturdy to withstand the stress associated with providing a tension of 25 to 50 kips.

What has been described is a lashing assembly provided for achieving a desired tension in a cable lashing and maintaining that tension. The lashing assembly includes a pair of mutually-engaging linking members, a detachable tensioning mechanism such as hydraulic jacks, and one or more locking wedges for insertion between the linking members to maintain a tension on the cable lashing. Alternatively, the tensioning device may be configured so that it is not easy to remove the jacks, and other tensioning means, such as ballscrews and jackscrews, can be used in lieu of hydraulic jacks. The use of wedges for locking the linking members in a position of relative displacement is substantially immune from an accidental unlocking, perhaps caused by vibration of the linking members. The wedges can be locked into position, if desired, by means of retaining pins placed in holes in one of the wedges. Alternatively, shims or spaces can be used in lieu of wedges or in conjunction with wedges. The detachable tensioning mechanism, such as a pair of hydraulic jacks, allow a number of cable lashings to be tensioning using the same tensioning mechanism. Specific desired tensioning capacities can be easily achieved to within ±1,000 pounds tension.

The lashing assembly is not substantially affected by corrosion, and is substantially weatherproof so as to not lock up or freeze up during use. Preferably, conventional sturdy metal components are used without the need for any exotic and costly materials. The entire lashing assembly is substantially fail-safe. By using locking wedges provided with angled edge portions, a continuous take-up adjustment is possible over a selected distance such as one inch. By using more than one wedge, or by using shims or spacers with a single wedge, a continuous take-up adjustment over a greater range is achieved. By providing a quick and easy technique for tensioning cables, the tension of the cables can be easily reset even while at sea, in response to changing weather and sea conditions.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A lashing assembly for tensioning a lashing, comprising:

tensioning means for providing selected tension to a lashing, the tension means being detachable from the lashing;

a coupling provided along said lashing, said coupling including first and second mutually-engaging linking members with interlocking elongated slots, the first linking member having a base mounted to the lashing and having a free end slidably engaged with the second linking member, the second linking member having a base mounted to the lashing and having a free end slidably engaged with the first linking member, and wherein the tensioning means engages said first and second linking members to provide the selected tension to the lashing; and wedge means for removably mounting between the first and second linking members for maintaining the tension on the lashing after the tensioning means is detached.

2. The lashing assembly of claim 1 wherein the wedge means includes a pair of wedge members for mounting in the interlocking elongated slots.

3. The lashing assembly of claim 1, wherein the tensioning means engages the bases of said linking members and pulls the bases together to provide tension on the lashing.

4. The lashing assembly of claim 1, wherein the tensioning means engages the free ends of the linking members and pushes the free ends apart, to pull the bases together and provide the tension on the lashing.

5. The lashing assembly of claim 1, wherein the coupling further comprises:

the first linking member having an elongated slot; and
the second linking member having a pair of elongated parallel slots; and
a guide means for securing the first linking member to the second linking member with the slot of the first linking member held between the parallel slots of the second linking member, the guide means limiting relative movement of the first and second linking members to movement along a single axis parallel to the elongated slots; and
wherein the detachable tensioning means engages said linking members and pulls said linking members together by a preselected amount to provide a tension to a lashing to which the coupling is mounted; and wherein said wedge means engages said linking members and prevents said linking members from being drawn apart by tension on said lashing to thereby maintain the lashing at the tension provided by the tensioning means, said wedge means being separate from said tensioning means.

6. The lashing assembly of claim 5, wherein the linking members each include a base portion, and wherein the slot of the first linking member is formed within an elongated extension member extending from the base portion of the first linking member, and wherein the slots of the second linking member are formed within elongated extension members extending from the base portion of the second linking member, the extension members of the second linking member being parallel with each other and being separated by a distance sized for closely receiving the extension member of the first linking member.

7. The assembly of claim 6, wherein the bases and the extension member of the linking members are flat plates.

8. The assembly of claim 6, wherein a free end of the extension member of the first linking member includes an abutment bar which extends perpendicularly through the slots of the extension members of the second linking member, and wherein a free end of the extension members of the second linking member include an abutment bar which extends perpendicularly through the slot of the extension member of the first linking member.

9. The assembly of claim 1, wherein one of the linking members connects to a deck fitting and the other linking member connects to a lashing cable 10. The lashing assembly of claim 1, wherein the coupling comprises:

guide means for securing the linking members together and for limiting relative movement of said linking means to movement along a single axis parallel to the lashing, and wherein the detachable tensioning means engages said linking members and pulls said linking members together along said axis by a preselected amount to provide a tension to the lashing, and wherein said wedge means maintains the lashing at the tension provided by the tensioning means, said wedge means being separate from said tensioning means.

11. The assembly of claim 10, wherein said wedge means engages said linking members and prevents said linking members from being drawn apart by tension on said lashing.

12. The assembly of claim 10, wherein the pair of linking members comprise:

a first linking member having an elongated extension member, said extension member having an elongated slot;
a second linking member having a pair of parallel elongated extension members, said parallel extension members each having an elongated slot, and
wherein said guide means secures the extension member of the first linking member between the parallel pair of extension members of the second linking member, with the slot of the first linking member parallel and adjacent to the slots of the second linking member.

13. The assembly of claim 10, wherein the linking members comprise:

a first linking member having a base and an elongated extension member extending outwardly from the base, the extension member having an elongated slot extending along the member from the base to a position intermediate a free end of the extension member;

a second linking member having a base, a pair of parallel elongated extension members extending outwardly from the base, a connecting bar connecting ends of the parallel extension members, with the extension members each having an elongated slot extending longitudinally along the respective member from the base to a position intermediate the end of the respective extension member, the extension member of the first linking member being slidably disposed between the parallel pair of extension members of the second linking member, with the slot of the first linking member being parallel and adjacent to the slots of the second linking member, and with the connecting member of the second linking member being slidably mounted through the slot of the first linking member.

14. The assembly of claim 12, wherein the bases of the linking members each include a pair of ears for engaging opposing ends of the detachable tensioning means.

15. The assembly of claim 12, wherein the bases and the extension member of the linking members are flat plates.

16. The assembly of claim 12, wherein the parallel pair of extension members of the second linking member are separated by a distance sized for closely receiving the extension member of the first linking member.

17. The assembly of claim 10, wherein the detachable tensioning means comprises a pair of jacks, each jack having a means for mounting to each of the opposing pair of linking members.

18. The assembly of claim 12, wherein a free end of the extension member of the first linking member includes a flat plate abutment bar which extends perpendicularly through the slots of the extension members of the second linking member, and wherein a free end of the extension members of the second linking member include a flat plate abutment bar which extends perpendicularly through the slot of the extension member of the first linking member.

19. The assembly of claim 18, wherein the wedge means comprises flat plate wedges for inserting into the slots of the extension members between the abutment bars, the wedges abutting each other and abutting inner edges of the abutment bars such that the abutment bars are prevented from being drawn together by tension on the lashing such that the linking members are prevented from being drawn apart.

20. The assembly of claim 19, wherein the wedges include angled edges, the linking members being locked at any one of a continuous range of relative displacement distances to secure the lashing at any of a continuous range of tensions.

21. The assembly of claim 10, wherein one of the linking members connects to a deck fitting and the other linking member connects to a lashing cable.

22. The assembly of claim 10, wherein the tensioning means includes means for providing a preselected tension.

23. The lashing assembly of claim 4, wherein the first linking member has a pair of elongated extension members, each elongated extension member having an elongated slot; the second linking member includes a pair of parallel elongated extension members, each elongated extension member of the second linking member also having an elongated slot; said pair of extension members of said first linking member being separated by a distance; said pair of extension members of said second linking member being separated by a lesser distance; free ends of the extension members of the first linking member being connected by a perpendicular connecting plate; free ends of the extension members of the second linking member being connected by a perpendicular connecting plate; said extension members of said second linking member being disposed between the extension members of the first inking member, with the connecting plate of the second linking member held within the elongated slots of the second linking member; and wherein the tensioning means engages the connecting members and pushes outwardly on said connecting members to thereby pull said linking members together to tension the lashing.

24. An assembly for securing a container to a support surface, said assembly comprising:
a lashing cable having a first end securely mounted to the support surface;
a first linking member with an elongated slot attached to a second end of the lashing cable;
a second linking member with an elongated slot securely mounted to the support surface and slidably connected to the first linking member through their slots;
guide means for securing the first and second linking members together and for limiting relative movement of the linking members to along a single axis parallel to the lashing cable;
detachable tensioning means for engaging said linking members and for pulling said linking members together along said axis to tension the lashing cable, and
locking means for maintaining the tension provided by the tensioning means, said locking means being separate from the tensioning means and including a pair of wedge members for removable insertion into the respective elongated slots.

25. An assembly for securing a container to the deck of a ship, said assembly comprising:
a lashing cable having a first end securely mounted to the deck of a ship;
a first linking member attached to a second end of the lashing cable, said first linking member having an elongated slot;
a second linking member securely mounted to the deck and slidably connected to the first linking member, said second linking member having a pair of elongated slots;
a guide on said second linking member, said guide engaging said first linking member and holding said slot of said first linking member between said slots of said second linking member, said guide limiting relative movement of said linking members to along an axis parallel to said slots and parallel to said lashing cable;
a detachable tensioning means for engaging said linking members and pulling said linking members together to tension the lashing cable, and
at least one wedge member inserted into said slots, said wedge member preventing relative outward movement of said linking members to maintain the tension provided by the tensioning means.

26. A lashing assembly for tensioning a lashing, comprising: p1 a first linking member with an elongated slot having, at one end of the slot, a first abutment member, and adjacent another end of the slot, first means for attachment to the lashing;

a second linking member with an elongated slot having, at one end of the slot, a second abutment member, and adjacent another end of the slot, second means for attachment to the lashing, the first and second linking members being permanently interconnected through the elongated slots, so that the first and second abutment members can freely move relative to each other;

tensioning means for providing selected tension to the lashing through the first and second linking members, the tensioning means being detachable from the first and second linking members; and wedge means for removably mounting between the first and second abutment members to maintain the selected tension applied by the tensioning means.

27. The lashing assembly of claim 26 wherein the wedge means includes a pair of wedge members for mounting in the interconnected elongated slots.

* * * * *